United States Patent [19]

Hamburg et al.

[11] 4,080,783
[45] Mar. 28, 1978

[54] TURBINE ENGINE LUBRICATION SYSTEM

[75] Inventors: Glenn Hamburg, Grosse Pointe Park, Mich.; Gytis Jasas, Toledo, Ohio

[73] Assignee: Teledyne Industries, Inc., Los Angeles, Calif.

[21] Appl. No.: 709,449

[22] Filed: Jul. 28, 1976

[51] Int. Cl.² ............................................. F02C 7/06
[52] U.S. Cl. ................................. 60/39.08; 184/6.11
[58] Field of Search ..................... 60/39.08; 184/6.11, 184/6.16, 6.26, 50.4

[56] References Cited

U.S. PATENT DOCUMENTS

| 2,740,267 | 4/1956 | Bayard | 60/39.08 |
| 2,784,551 | 3/1957 | Karlby et al. | 60/39.08 |
| 2,986,433 | 5/1961 | Herrmann | 60/39.08 |
| 3,078,667 | 2/1963 | Deinhandt | 60/39.08 |
| 3,377,802 | 4/1968 | Wilkinson et al. | 60/39.08 |

Primary Examiner—Carlton R. Croyle
Assistant Examiner—L. T. Casaregola
Attorney, Agent, or Firm—Gifford, Chandler, Van Ophem, Sheridan & Sprinkle

[57] ABSTRACT

A bearing lubrication system for a turbine engine is provided which utilizes a fuel-air mist to both lubricate and cool the bearing assembly. An annular fuel-air distributor is positioned adjacent the bearing assembly and includes an inlet and several outlet ports directed towards the bearing assembly. A fuel port and a source of pressurized air are coupled to the inlet of the fuel-air distributor so that the pressurized air mixes the fuel into the air and projects a fuel-air mist through the distributor and onto the bearing assembly. A fuel metering device maintains the fuel-air ratio outside of its flammability range to prevent fires within the bearing cavity. Exhaust passageways from the bearing cavity are disposed adjacent the bearing outer race to provide additional cooling of the bearing assembly during the exhaustion of the fuel-air mist from the bearing cavity.

10 Claims, 3 Drawing Figures

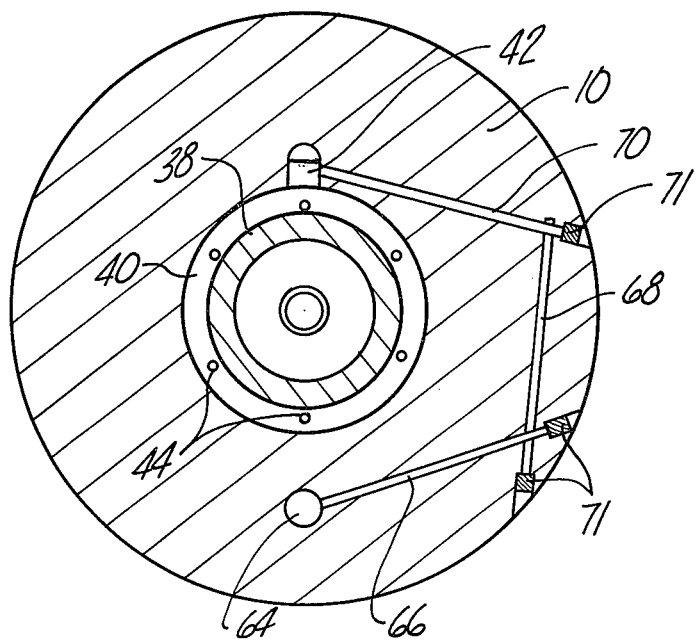
_Fig-2_
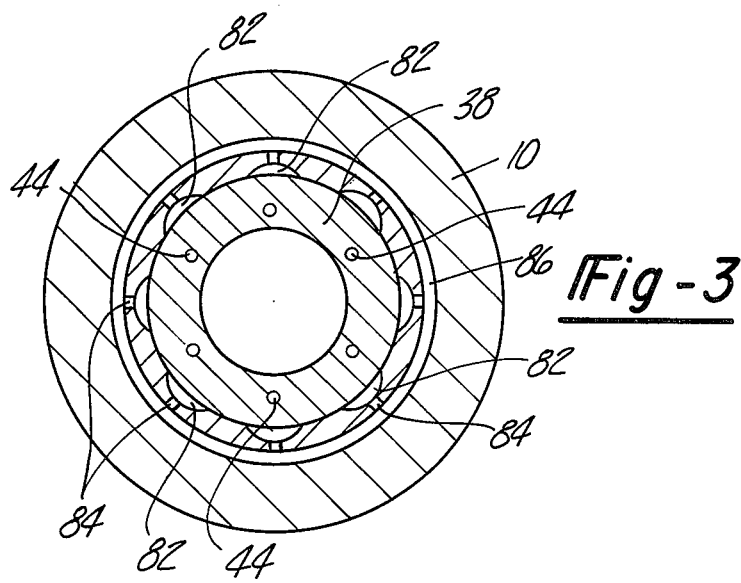
_Fig-3_

TURBINE ENGINE LUBRICATION SYSTEM

BACKGROUND OF THE INVENTION

I. Field of the Invention

The present invention relates generally to turbine engine lubrication systems and, more particularly, to such a lubrication system which utilizes a fuel-air mist as the lubricant.

II. Description of the Prior Art

All turbine engines include a turbine shaft which is rotatably mounted by a bearing assembly to a stationary support housing. Due to the nature of operation of the turbine engine, the turbine shaft necessarily rotates at high speeds. Consequently, the bearing assembly must not only be adequately lubricated but also cooled in order to prevent failure of the bearings. A bearing failure can result in destruction of the turbine engine.

The previously known turbine engine bearing lubrication systems, however, have proven inadequate in operation and/or expensive in construction. Typically, these previously known systems include oil pumps, external oil supply reservoirs, and associated components which continuously pump oil through the bearing assembly. The multiplicity of components within these previously known lubrication systems not only greatly increased the cost, but also the failure rate of such systems since failure of any of several components disabled the entire lubrication system. Since failure of the lubrication system often results in the destruction of the turbine engine, the previously known turbine engines typically included back-up or secondary oil systems which operated upon the failure of the primary lubrication system. These secondary lubrication systems increase not only the weight but also the overall cost of the turbine engine.

In an effort to overcome some of the above mentioned disadvantages of the previously known turbine engine lubrication systems, Wilkinson et al disclose in their U.S. Pat. No. 3,377,802 which issued on Apr. 16, 1968, a turbine engine lubrication system which utilizes compressed air mixed with oil to lubricate the turbine bearing assembly. The Wilkinson lubrication system, however, is a recirculatory lubrication system which collects and cools the oil lubricant in oil reservoirs. Consequently, Wilkinson retains much of the complexity of the other previously known turbine lubrication systems.

SUMMARY OF THE PRESENT INVENTION

The turbine engine lubrication system of the present invention obviates the above mentioned disadvantages of the previously known lubrication systems by projecting a fuel-air mist toward and onto the bearing assembly within the bearing cavity to not only lubricate but to also cool the bearing assembly.

In brief, the lubrication system of the present invention comprises an annular fuel-air distributor coaxially positioned around the turbine shaft adjacent the bearing assembly. The fuel-air distributor includes an inlet passage and a plurality of output passages directed toward the bearing assembly.

Both a source of pressurized air, preferably from the compressor or combustor housings, and a source of fuel, preferably from the turbine engine main fuel pump, are connected to the inlet of the fuel-air distributor. The pressurized air mixes the fuel with the air and propels the resultant fuel-air mist through the distributor and onto the bearing assembly. The fuel-air mist both lubricates and cools the bearing assembly.

A fuel metering device is interposed between the fuel supply and the fuel-air distributor. The metering device, preferably a restricted orifice, maintains and controls the fuel-air ratio outside of its flammability range to prevent internal fires within the bearing cavity.

The fuel-air mist is exhausted through axial passageways circumferentially spaced along the outer periphery of the outer race of the bearing assembly. The fuel-air mist thus further cools the bearing assembly upon exhaustion from the bearing cavity.

The turbine engine lubrication system of the present invention thus provides a greatly simplified and low cost lubrication system which contains no moving parts, so that failure of the lubrication system is virtually impossible. Consequently, the necessity of a secondary lubrication system is rendered unnecessary. Moreover, the lubrication system of the present invention utilizes the already available compressed air from the compressor or combustor housing and the pressurized fuel from the main fuel pump as the lubricant. The lubricant, once exhausted from the bearing cavity, enters the exhaust stream of the engine thus eliminating the need for oil reservoirs, sump pumps, or the like.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a cross sectional view taken substantially along line 2—2 in FIG. 1; and FIG. 3 is a cross sectional view taken substantially along line 3—3 in FIG. 1.

DETAILED DESCRIPTION OF THE PRESENT INVENTION

Figure 1:
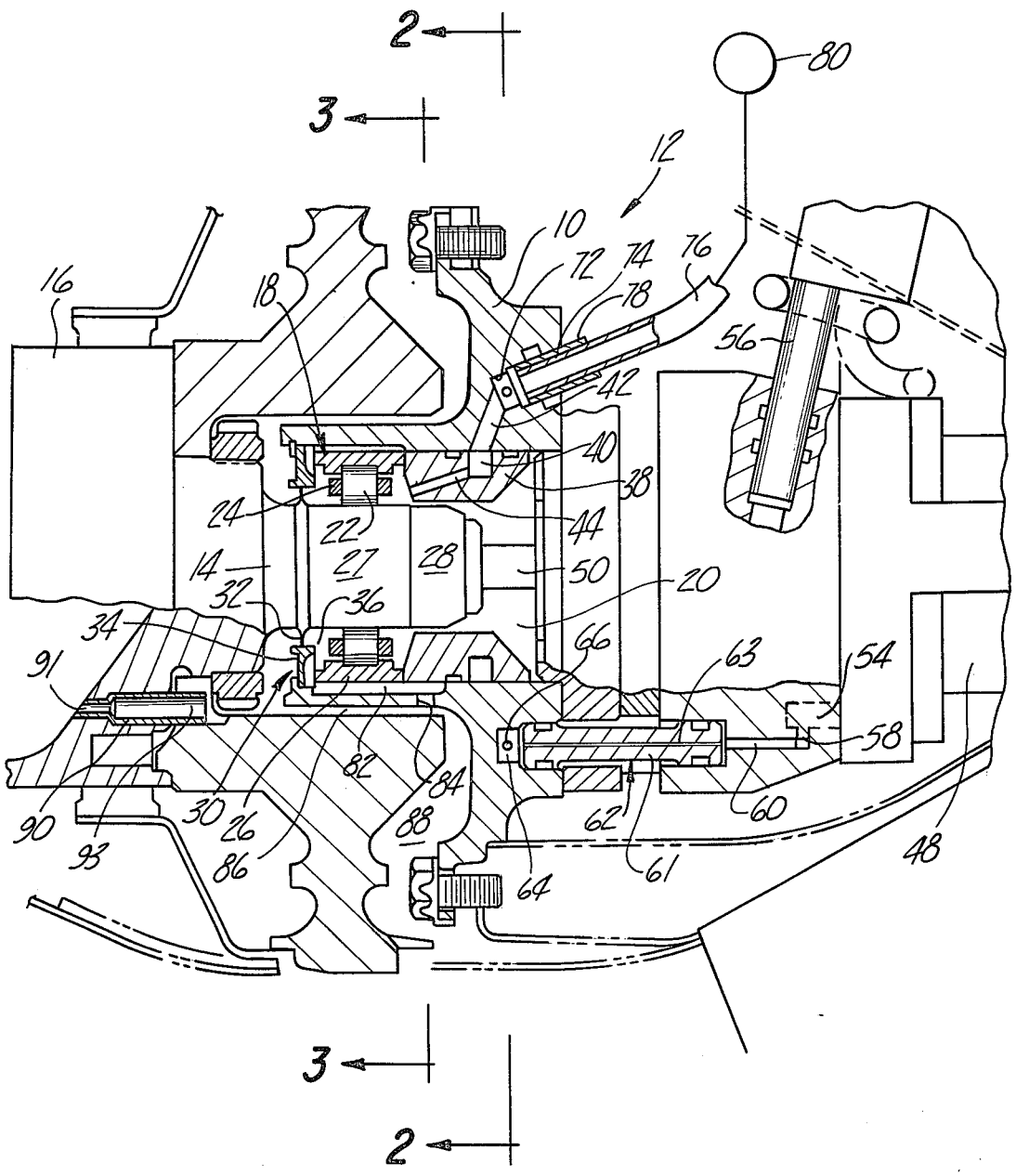
FIG. 1 is a fragmentary side cross sectional view of a turbine engine utilizing the lubrication system of the present invention.

Referring first particularly to FIG. 1, a support housing 10 of a turbine engine 12 is thereshown in fragmentary cross sectional form. An extension 14 of a main turbine shaft 16 is rotatably carried by a bearing assembly 18 within an annular bearing cavity 36 in the support housing 10. The bearing cavity 36 forms one part of an axially elongated, annular housing cavity 20.

Although any conventional bearing assembly 18 may be utilized while remaining within the scope of the invention, as shown, the bearing assembly 18 is a roller bearing assembly having a plurality of rollers 22 retained and separated by a bearing separator 24. The rollers 22 are carried between an outer race 26 secured to the support housing 10 and an inner race 27 secured to the turbine shaft extension 14 by a nut 28.

A seal 30 having a grooved labyrinth seal piece 32 secured to the shaft extension 14 and a mating land 34 secured to the support housing 10 is positioned within the cavity 20 between the main shaft 16 and the bearing assembly 18. The seal 30 thus separates the bearing assembly 18 from the main shaft 16 and forms one end of the bearing cavity 36 within the support housing 10.

Referring now to FIGS. 1-3, an annular fuel-air distributor 38 is secured to the support housing 10 within the cavity 20 adjacent the outer bearing race 26 and forms the other end of the bearing cavity 36. An annular groove 40 formed around the outer periphery of the distributor 38 registers with a passageway 42 in the support housing 10. The distributor 38 also includes a plurality of circumferentially spaced, substantially axially extending passageways 44. Each passageway 44 is open on one end to the annular groove 40 and on the other end to the bearing cavity 36 such that the axis of each passageway 44 generally intersects the bearing assembly 18.

As can best be seen in FIG. 1, a main fuel pump 48 is contained within the cavity 20 and is rotatably driven by a quill shaft 50 attached to the main shaft extension 14. The main fuel pump 48, which is supplied fuel through inlet tube 56, supplies fuel not only to the turbine engine 12, but also to an opening 54. The opening 54 is coupled through passages 58 and 60 to one end of a fuel metering device 62.

Still referring to FIG. 1, the device 62 meters and restricts the fuel flow from the passage 60 to an opening 64 in the support housing 10. Although any conventional fuel metering means can be used, as shown, the device 62 comprises a cylindrical member 61 having a restricted axial orifice 63 formed therethrough. The diameter of the orifice 63 defines the fuel flow rate through the device 62 in the conventional manner.

As best shown in FIG. 2, the opening 64 is coupled by interconnecting passageways 66, 68, and 70 to the passageway 42 in the support housing 10 which registers with the annular groove 40 in the fuel air distributor 38. One end of each passageway 66, 68, and 70 is closed by a plug 71 to prevent fluid leakage between the opening 64 and the passageway 42. As thus far described it can be seen that the main fuel pump 48 supplies a metered amount of fuel from the fuel supply (not shown) to the passageway 42.

A bore 72 intersects the passageway 42 within the support housing 10. One end 74 of a tube 76 is coupled by a sleeve 78 within the bore 72. The other end of the tube 76 is coupled to a source 80 of pressurized air (illustrated diagrammatically). Preferably the source 80 comprises the compressor or combustor portions of the turbine engine 12.

With reference now particularly to FIGS. 1 and 3, a plurality of circumferentially spaced axial grooves 82 are formed within the support housing and adjacent the outer periphery of the outer bearing race 26. Each groove 82 is open at one end to the bearing cavity 36 adjacent the sealing arrangement 30. A radial port 84 at the other end of each groove 82 connects each groove 82 to an annular chamber 86 (FIG. 1) within the support housing 10. The chamber 86 in turn is open through an exhaust passage 88 to the turbine engine exhaust.

A plurality of tubes 90 are open on one end 91 to the compressed air from the turbine compressor and on the other end 93 to the annular chamber 86.

The operation of the turbine engine lubrication system of the present invention is as follows: With the main turbine shaft 16 rotatably driving the main fuel pump 48 through the quill shaft 50, fuel is supplied through passageways 58 and 60, the metering device 62 and passageways 66, 68, and 70 to the passageway 42 in the support housing 10. Simultaneously, the air source 80, supplies pressurized air through the tube 76 and into the passageway 42. The compressed air mixes with the fuel and propels the resultant fuel-air mixture into the annular groove 40 of the fuel-air distributor 38. From the annular groove 40, the fuel-air mixture is projected into the bearing cavity through the axial passageways 44 whereupon the fuel-air mixture contacts, lubricates and cools the bearing assembly 18.

After passing through the bearing assembly 18, the fuel-air mixture is deflected into and through the axial grooves 82 by the sealing arrangement 30. Consequently, as the fuel-air mixture exhausts from the bearing cavity 36, the still relatively cool fuel-air mixture contacts the outer periphery of and further cools the outer bearing race 26. The fuel-air mixture exhausts from the axial grooves 82 through the radial ports 84 and into the turbine engine exhaust stream via the exhaust passage 88.

The metering device 62 controls and maintains the fuel-air mixture which enters the bearing cavity 36 outside of its flammability range to prevent internal fires within the bearing cavity 36. Similarly, the compressed air from the tubes 90 further dilutes the fuel-air mixture as it enters the cavity 88 of the turbine engine 12 to prevent ignition of the mixture in this cavity.

It can thus be seen that the turbine engine lubrication system of the present invention provides a simple, inexpensive, and self-contained bearing lubrication system for a turbine engine. Both the compressed air and the fuel supply are already available within the conventional turbine engine 12 thus eliminating the need and expense of additional lubrication pumps and their associated components. Moreover, since the fuel air lubricant is exhausted into the exhaust stream of the turbine engine, lubricant reservoirs and the like are rendered unnecessary.

A still further advantage of the lubrication system of the present invention is that it utilizes no moving parts other than the main fuel pump 48 and the source 80 of pressurized air, both of which are available in the turbine engine 12. Consequently, a failure of the lubrication system is virtually impossible so that a secondary or back-up lubrication system for the turbine engine is unnecessary along with the undesirable weight and cost of such back-up systems.

Having thus described our invention many modifications thereto will become apparent to those skilled in the art to which it pertains without deviating from the spirit of the invention as defined by the scope of the appended claims.

We claim:

1. A lubrication system for a turbine for lubricating a bearing assembly within a bearing cavity, said system comprising:

a source of pressurized air;

an annular distributor contained within the bearing cavity and having inlet means comprising an annular groove in the distributor, said distributor further having outlet means comprising a plurality of substantially axial passageways, each passageway being open at one end to said annular groove and open at its other end to the bearing cavity;

first passage means for fluidly connecting said pressurized air source with said distributor inlet means so that a fluid flow through said distributor is obtained;

a source of fuel, and second passage means for fluidly connecting said fuel source to said first passage means, whereby an air-fuel mixture forms the fluid flow through said distributor, wherein said air-fuel mixture impinges upon said bearing assembly to lubricate the same.

2. The invention as defined in claim 1 and including fuel metering means operatively disposed in said second passage means for maintaining said air-fuel mixture at a high air to fuel ratio to thereby inhibit the ignition of said air-fuel mixture.

3. The invention as defined in claim 1 and including third passage means for exhausting said air-fuel mixture from said bearing cavity.

4. The invention as defined in claim 3 wherein said third passage means is disposed adjacent said bearing assembly to thereby cool said bearing assembly upon exhaustion of the fuel-air mixture from the bearing cavity.

5. The invention as defined in claim 4 wherein said bearing assembly includes an outer race and wherein said third passage means comprises a plurality of circumferentially spaced axial grooves adjacent the outer periphery of said outer race open on one end to said bearing cavity and at the other end to the exhaust from the turbine.

6. The invention as defined in claim 2 wherein said fuel metering means comprises a member having a restricted orifice formed therethrough.

7. A lubrication system for a turbine for lubricating a bearing assembly having an outer race and being positioned within a bearing cavity, said system comprising:
 a source of pressurized air;
 first passage means for fluidly connecting said pressurized air source to said bearing cavity;
 a source of fuel;
 second passage means for fluidly connecting said fuel source to said first passage means so that said fuel mixes with said air and forms an air-fuel mixture which is projected into said bearing cavity to thereby lubricate said bearing assembly; and
 third passage means for exhausting said air-fuel mixture from said bearing cavity, said third passage means further comprising a plurality of circumferentially spaced axial grooves adjacent the outer periphery of said outer race, each groove being open at one end to said bearing cavity and at the other end to an exhaust from said turbine, whereby the exhaustion of the air-fuel mixture from said bearing cavity and through said third passage means further cools said bearing assembly.

8. The invention as defined in claim 7 wherein said first passage means includes an annular distributor contained within the bearing cavity and having an inlet means for receiving the air-fuel mixture and an outlet means for directing said air-fuel mixture toward said bearing assembly.

9. The invention as defined in claim 8 wherein said inlet means comprises an annular groove in said distributor and wherein said outlet means comprises a plurality of substantially axial passageways open at one end to said annular groove and open at their other end to said bearing cavity.

10. The invention as defined in claim 7 and including further means for injecting air into said third passage means to thereby produce a high air to fuel ratio in said mixture to thereby inhibit the ignition of said air-fuel mixture.

* * * * *